Figure 1:
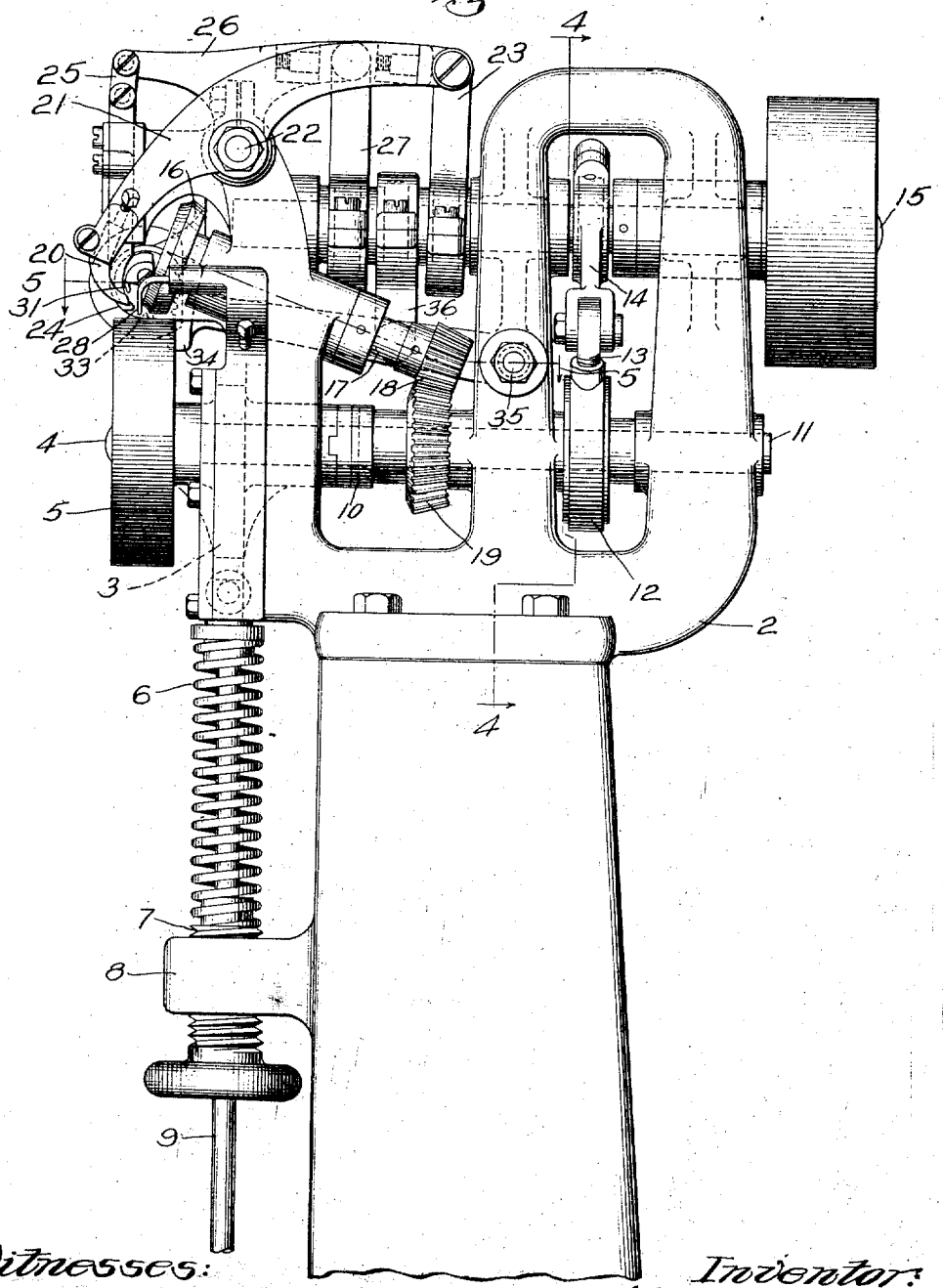

C. P. STANBON.

INSOLE REINFORCING MACHINE.

APPLICATION FILED APR. 28, 1911.

Reissued July 25, 1911.

13,278.

5 SHEETS—SHEET 1.

Witnesses:

Roswell T. Hatch

Thomas G. Ogden

Inventor:

Charles P. Stanbon by his Attorneys

Phillips Van Emmen & Finch

C. P. STANBON.

INSOLE REINFORCING MACHINE.

APPLICATION FILED APR. 28. 1911.

Reissued July 25, 1911.

13,278.

5 SHEETS—SHEET 2.

Witnesses:
Roswell F. Hatch
Warren G. Ogden

Inventor:
Charles P. Stanbon
by his Attorneys
Phillips Van Emon & Fish

C. P. STANBON.

INSOLE REINFORCING MACHINE.

APPLICATION FILED APR. 28, 1911.

Reissued July 25, 1911.

13,278.

5 SHEETS—SHEET 3.

Witnesses:
Roswell R. Hatch
Thomas G. Ogden

Inventor:
Charles P. Stanbon
by his Attorneys
Philip S. Van Cleven & Fish

C. P. STANBON.

INSOLE REINFORCING MACHINE.

APPLICATION FILED APR. 28, 1911.

Reissued July 25, 1911.

13,278.

5 SHEETS—SHEET 4.

Witnesses:

Powell F. Hatch.

Warren G. Ogden

Inventor:

Charles P. Stanbon by his Attorneys

Phillips Van Emon & Fish

C. P. STANBON.

INSOLE REINFORCING MACHINE.

APPLICATION FILED APR. 28, 1911.

Reissued July 25, 1911.

13,278.

5 SHEETS—SHEET 5.

Witnesses:
Roswell F. Hatch
Warren G. Ogden

Inventor:
Charles P. Stanbon
by his Attorneys
Phillips Van Orman & Fish

UNITED STATES PATENT OFFICE.

CHARLES PETER STANBON, OF LYNN, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

INSOLE-REINFORCING MACHINE.

13,278. Specification of Reissued Letters Patent. Reissued July 25, 1911.

Original No. 945,348, dated January 4, 1910, Serial No. 350,673. Application for reissue filed April 28, 1911. Serial No. 623,970.

*To all whom it may concern:*

Be it known that I, CHARLES PETER STANBON, a citizen of the United States, residing at Lynn, in the county of Essex, State of Massachusetts, have invented an Improvement in Insole-Reinforcing Machines, of which the following description, in connection with the accompanying drawings, is a specification, like characters on the drawings representing like parts.

In the manufacture of boots and shoes, particularly in the manufacture of what are known as "welt shoes" it has become common to employ insoles made from a low grade or light leather reinforced by a fabric to furnish the necessary strength, particularly at the bases of the lips through which the inseam stitches are formed. In the making of a reinforced sole of this type, the leather sole that is to be reinforced is usually channeled and the channel lip "turned" or "set" in an upturned and usually nearly vertical position before the reinforcing fabric is applied thereto. My present invention has no reference to the formation of this leather sole, nor to the upturning or setting of the channel lip thereon, all of which are supposed to have been performed prior to that step in the manufacture of the reinforced sole at which my present invention is intended to become available. The reinforced fabric is ordinarily first laid upon the channel side of the leather sole by hand and my present invention relates to a machine for receiving the sole with the fabric thus roughly or approximately positioned thereon, and tucking or working the fabric into the channel and close to and upon the previously turned or set lip thereof, particularly in the vicinity of its base.

The various features comprising my invention will be best understood from a description of one embodiment thereof, which has been selected for the purpose of illustration.

Figure 2:
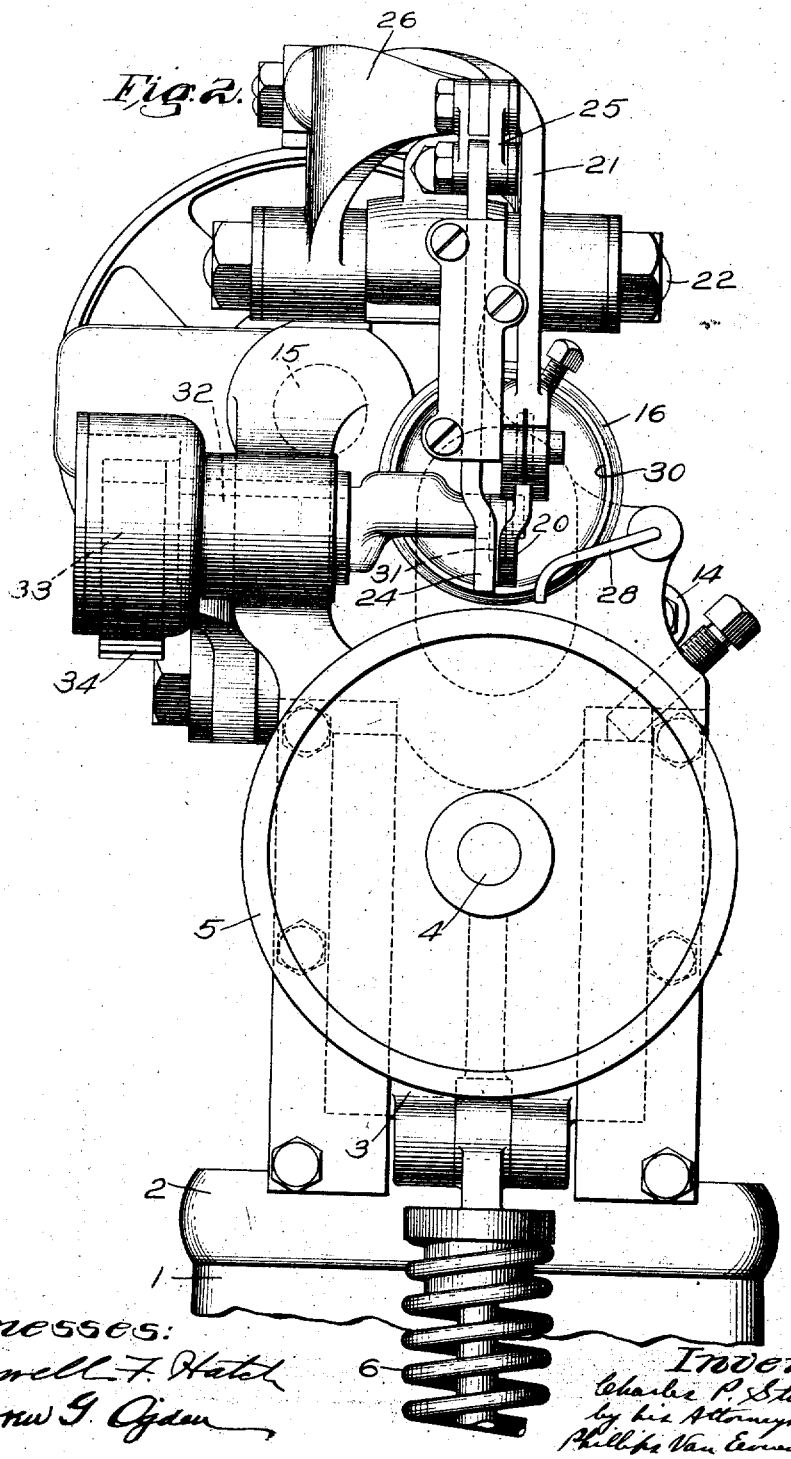
Figure 3:
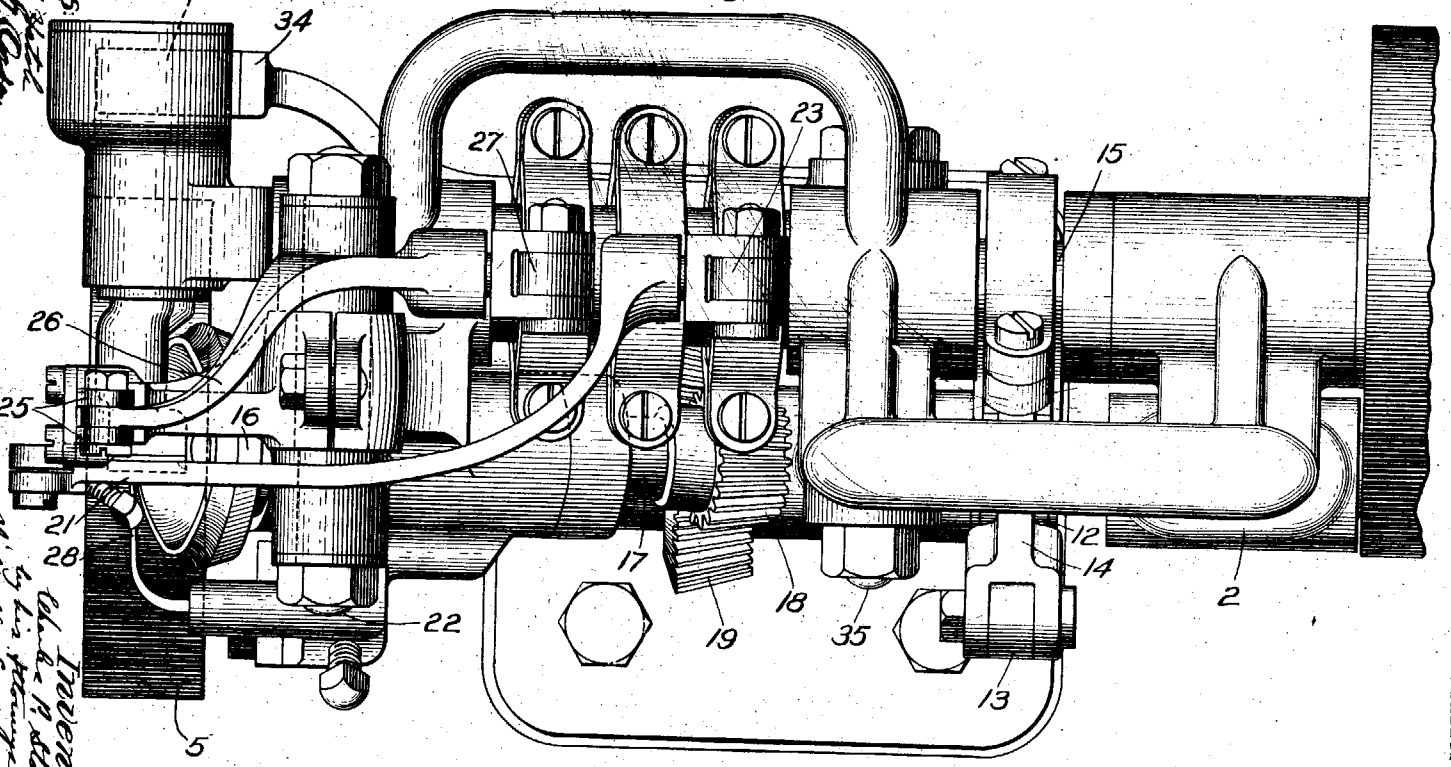
Figure 4:
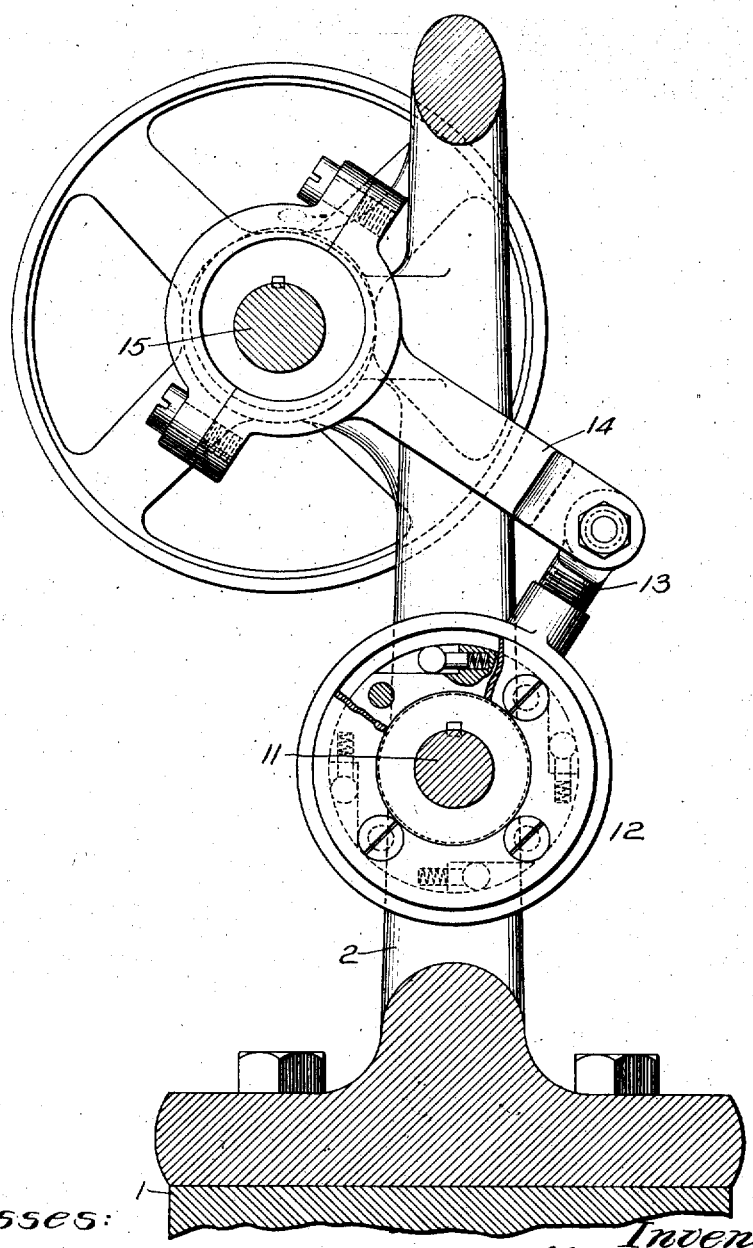
Figure 5:
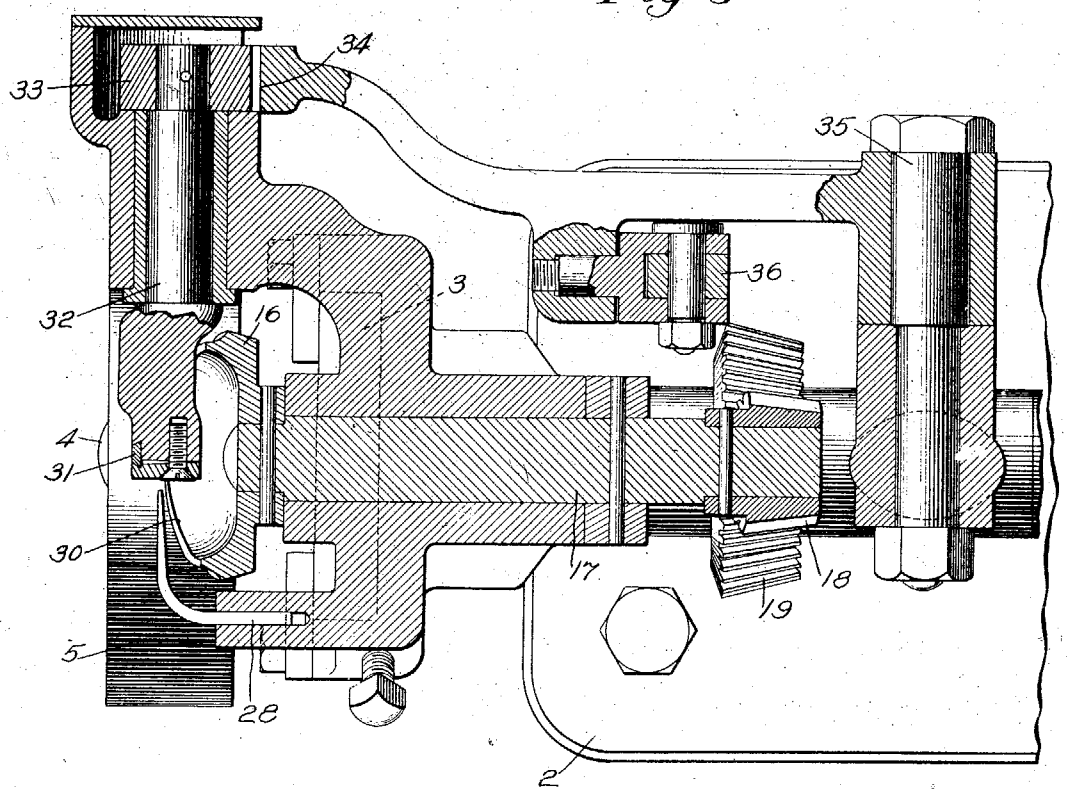
Figure 6:
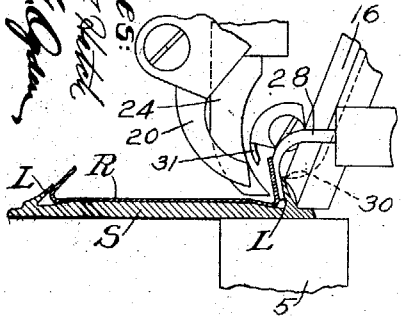

In the accompanying drawings,—Figure 1 is a side elevation of a machine illustrating the selected embodiment of my invention; Fig. 2 is a left hand or front elevation of the machine, Fig. 1; Fig. 3 is a top view of the machine, Fig. 1, this view being on an enlarged scale; Fig. 4 is a vertical cross section on the dotted line 4—4, Fig. 1, looking to the right, also on an enlarged scale; Fig. 5 is a horizontal section on the dotted line 5—5, Fig. 1, looking downward, on an enlarged scale; Fig. 6, a detail in cross section illustrating one condition of inseam and its roughly applied reinforcing material as it would be brought to the machine illustrated; and Fig. 7, a corresponding view showing the work after having passed through said machine.

In the embodiment of my invention selected for disclosure herein and shown in the drawings, referring first to Fig. 1, the column 1 carries a suitable head 2, provided at its left hand end or front, with vertical ways for the work supporting slide 3, shown in dotted lines. This slide has bearings for the work supporting shaft 4, carrying at its outer end the work supporting wheel 5. The work supporting slide is supported from beneath by a spring 6, which bears against said slide at its upper end and at its lower end is seated upon an adjusting screw 7, tapped into a lug 8, on the column. This screw is made tubular to receive the treadle rod 9, which extends upward through said spring and is jointed at its upper end to the bottom of the work supporting slide. This rod and its attached treadle or operating device (not shown) furnish means for depressing the work supporting wheel 5, for introduction of the work, said spring thereafter lifting said wheel and its work to hold the latter firmly in position.

The work supporting shaft 4 at its inner end is operated by a connection 10, of any desired construction that will permit said shaft to be moved vertically by and with the work supporting wheel, without losing its operative connection with the driving shaft 11, substantially alined therewith and turning in suitable bearings in the machine head. At its rear end said driving shaft is provided with a roller or other suitable clutch 12, see Fig. 4, which is operated by a radially extended arm 13, jointed to the end of an eccentric rod 14, the eccentric of which is fast upon the main shaft 15, of the machine and journaled in the machine head above said driving shaft 11. Rotation of said main shaft operates through said eccentric to oscillate the clutch 12, to impart by said clutch, a step by step rotation to the work supporting shaft and its wheel, always in one direction. The extent of each step movement of the work supporting wheel may be varied by varying the point of connection of the eccentric rod with the radial clutch arm at 13.

Immediately above the work supporting wheel is an obliquely arranged clamping wheel or presser 16, fast upon a shaft 17, journaled in the machine head and driven at its inner end from the driving shaft 11, by beveled gear wheels 18 and 19. Thus, each step rotation of the work supporting wheel is accompanied by a corresponding step rotation in the same direction, of the presser or clamping wheel 16. The described construction and arrangement are such that an insole clamped at its margin between the said work supporting and presser wheels, will receive a rapid step by step feed to cause it to progress through the machine to be operated upon, as will be described.

Figure 7:
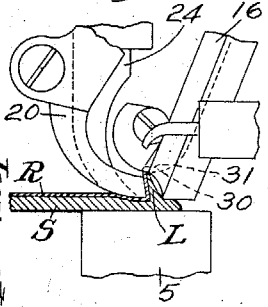

Referring to Fig. 6, the insole S is shown in position clamped between the work supporting and presser wheels, the latter furnishing a continuous marginal clamp for the sole outside the lip L. This lip has been previously turned and set in a manner well understood by those skilled in the art and by any well-known lip turning and setting machine. The reinforcing fabric R previously cemented at its under side, has been applied manually and approximately to the lipped face of the insole which also may have been previously cemented, if desired. In applying the fabric by hand, it is difficult to lay the same down into the bottom of the channel and against the inner face of the upturned and set lip except by the exercise of such time and care as would prohibit the use of said soles. The machine containing my invention is intended to receive the work as shown in Fig. 6 and to lay or tuck the material within the upturned and set lip down to the bottom of the channel, as indicated in Fig. 7. To accomplish this, I employ a tucking tool, herein marked 20, and so mount and move it as to cause it to lay the material down along and upon the bottom of the channel to the bottom thereof and also against the inner upturned face of the set lip. This tool is not a lip setting tool, its purpose being to lay or push the reinforcing fabric against and into adhering contact with the inner face of the turned and set lip. To this end, said tucking tool, see Fig. 1, is adjustably mounted in the lower end of a lever 21, suitably fulcrumed, as at 22, on the head of the machine, and actuated at its rear end by an eccentric rod 23, whose eccentric is fastened upon and operated by the main shaft 15. This eccentric operates to impart to said tucking tool a rapid in and out or tucking motion, such as will catch the material lying, for example, in the position Fig. 6 and tuck it snugly into the bottom of the channel, as indicated in Fig. 7.

The shapes of shoe soles are frequently such, particularly when for use in the manufacture of women's shoes, that little width of sole is left between the channels along the shanks of the soles. The channel is usually cut of uniform width throughout, and if the shank of the sole is very narrow, the channel cuts away so much of the width thereof and at each side thereof, as to leave little if any uncut surface between the same. This makes it important to have the reinforcing material pressed into firm contact with the face or surface of the sole next adjacent the inner edge of the channel for, if this be not done in a narrow shank such as above referred to, there would be nothing to prevent the tucking action in the channel at one side the sole, or the welt sewing machine in drawing and setting the stitches in the channel at one side the sole, from exerting by its action upon the reinforcing fabric a sufficient pull to drag the entire reinforcing covering across the sole and out from position relative to the channel on the opposite side thereof. While this action is less material in the wider or ball positions of the sole, nevertheless it is desirable at all points that the material be closely laid upon the face of the sole next the inner edge of the channel, otherwise the needle of the welt sewing machine is likely to pass under the fabric and pick it up and lift it away from the sole instead of penetrating and passing through it, as it should for the best results. For the purpose of thus laying the fabric closely upon the sole along the inner channel line, as stated, my invention contemplates the use of a hammer 24, best shown in Figs. 1 and 2, and also in diagram, Fig. 7, which is mounted for vertical reciprocation in the head in such position that, as the sole is fed through the machine, said hammer may be reciprocated to cause it to deliver a rapid succession of hammer blows upon the fabric just within the channel to insure proper adhesive contact of the same with the sole beneath. This hammer may be operated in suitable manner and the sharper the blow it is made to deliver, the better will be the adhesion resulting therefrom. In the present instance, such hammer is connected by a link 25, see Fig. 1, with a lever 26, fulcrumed at 22 and operated by an eccentric rod 27, from another eccentric upon the main shaft 15. I have herein used an eccentric because of its easy motion, but a cam may be employed instead, if desired.

I am able to use a hammer blow or action at the point described upon the sole, because the sole is otherwise and continuously clamped in position for feeding soles to resist any tendency to transverse dislocation by the tucking action of the tool 20; in fact, I prefer, for other reasons, that the hammer be not so constructed and operated as to serve in any sense as a presser, because if so used, it might interfere with the tucking of the reinforcing material into the channel. As herein shown and ordinarily the eccentric that operates the hammer is so positioned that the hammer blow is delivered in advance of the tucking action of the tucker, thereby imposing no restriction upon the action of the latter.

In the interval between the approximate positioning of the fabric on the leather sole and the presentation of such material and sole to the machine involving my invention, the loose marginal portion of the fabric has opportunity to fall and is frequently pressed by stacking, into contact with the lip and becomes more or less firmly adhered to such lip. For the best work this false adhesion or contact should be freed before the tucking tool is permitted to act effectively. To this end I have provided what for convenience may be called a lip clearer, marked 28, the same being shaped and adjustably positioned to travel along close to the inner face of the lip and clear it or free it of any adhesive contact of the fabric therewith in advance of the point at which the tucking tool acts. This leaves the tucking tool free to place the material with the best possible results.

The reinforcing material is usually died out to an approximate shape only, which renders it necessary to trim the margin thereof that projects above and beyond the sole lip after the reinforcement has been completed. Of course, the reinforcing material may be died out accurately and in such event, if accurately laid, no subsequent trimming would be required. For the purpose of trimming any projecting margin of such material, I have herein provided trimming means as follows: The clamping wheel 16 (see Fig. 5) is cupped at its front to provide a cutting edge 30, which is continued around its periphery, and, coöperating with its cutting edge is an oscillatory or vibratory cutter 31, see Fig. 1, also Fig. 5, adjustably clamped upon the end of a cutter shaft 32, horizontally mounted in the machine head. At its upper end said cutter shaft carries a pinion 33, driven by a segmental gear 34, see Fig. 1, fulcrumed at its rear end in the machine head at 35, and driven intermediate its fulcrumed and toothed ends by an eccentric rod 36 from a third eccentric on the main shaft. This construction is such that as fast as the tucked and reinforced sole is fed past the tucking tool, the rapid operations of the trimming knife 31, coöperating with the cutting edge on the clamping wheel, will trim off the projecting edge of the reinforcing material on a line substantially coincident with the crown of the upturned lip. Because the clamping wheel is constantly in rotation, a new cutting edge is constantly presented for coöperation with the cutting knife, so that a permanent efficient cutting action is assured. As the knife dulls and is sharpened, it may be set forward by means of its clamp. The step by step feeding movement of the clamping wheel gives opportunity for the cutting action between the feeds, so that in the preferred adjustment of the machine, there is no relative side travel of the cutting knives at the moment of cutting.

It will be observed that the face of the clamping wheel between the clamping surface and the edge that coöperates with the cutting knife, is concave, so as to free the lip of any back support substantially throughout the width of its concavity. I have found that the set and inherent stability of the lip is of itself sufficient to hold it against the pressure of the tucking tool without any back support and that the latter, if provided, might tend to prevent such conformation of the lip under the tucking action as would be necessary to enable it to present a suitable surface to the fabric when the latter is pressed against it by the tucking tool.

The active end of the tucking tool may be given any desired shape to conform to the shape or channel and adjacent base of the upturned lip. It is not necessary that the lip be turned or set to a position truly perpendicular to the sole; in fact, it is better if it be set only to such an extent as will insure it ultimately occupying a position at an angle of about 45 degrees or more with the bottom of the channel; therefore, the active end of the tucking tool will be shaped to permit it to draw or tuck the fabric to the bottom of the channel and beneath the lip extending at such angle.

If the materials ar such that the arrangement of cutting knife gives annoyance from clogging, its radius of action can be increased so as to offer more clearance. Instead of producing a shear cut, as here shown, by the cutting knife overlapping the cutting edge of the clamping wheel, a chopping block provided with a proper face material of soft brass or other material may be employed.

My invention is not limited to the particular embodiment thereof herein selected for illustrative purposes, since obviously such invention may be variously embodied within its broad spirit and scope.

Claims:

1. A sole reinforcing machine comprising, in combination, a work supporting and feeding wheel, an opposed coöperating sole clamping and compressing wheel for acting on the marginal portion of the sole, a vibratory tucking tool, means to operate the tucking tool in a direction diagonally downward toward and with reference to the sole surface to tuck the material into the channel formed by an upturned lip, and means for positively operating the feeding wheel and sole clamping wheel.

2. An insole reinforcing machine comprising, in combination, work supporting and feeding means, a vibrating tucking tool, a hammer arranged at one side of said tucking tool, and means to operate said tucking tool and hammer alternately.

3. An insole reinforcing machine comprising, in combination, work supporting means, intermittent feeding means, a vibratable tucking tool, a hammer, and means to operate said tools and hammer between feeds of the work.

4. An insole reinforcing machine comprising, in combination, work supporting and feeding means, a sole clamping and compressing wheel coöperating therewith, means for imparting a step-by-step motion to said feeding means and compressing wheel, tucking means, and operating devices thereafter to move the tucking means in a direction diagonal to the sole surface toward and from the point of the sole held between the feeding and sole clamping wheel.

5. An insole reinforcing machine comprising, in combination, work supporting and feeding means, an edge compressing wheel acting with compressing contact on the sole edge outside the channel lip, means for moving said feeding means and compressing wheel step-by-step, a cloth tucking tool, and means to vibrate it in a plane diagonal to the surface of the insole to tuck the reinforcing material into the channel formed by a lip turned upward and toward the sole edge.

6. In an insole reinforcing machine, the combination of a work support, a step-by-step feed motion connected with said support, a cloth tucking tool and its operating means, constructed and arranged to tuck the reinforcing material into the channel formed by a lip turned upward and toward the sole edge, edge compressing means acting upon the top of the sole edge outside the channel lip, and a trimming knife acting in conjunction with said tucking tool to trim the reinforcing material projecting above the channel lip.

7. An insole reinforcing machine comprising, in combination, a work support, means for operating said work support step-by-step, an edge compressing wheel acting upon the surface of the sole edge outside the channel lip, means for moving said edge compressing wheel step-by-step, a cloth tucking tool, means for vibrating it in a direction diagonal to the surface of the sole to tuck the reinforcing material into the channel formed by a lip turned upward and toward the sole edge, a knife, and means for vibrating it in a path extending across the top of the channel lip.

8. A machine for applying reinforcing fabric to a lipped insole, having, in combination, means for holding a sole in position to be operated upon, a tool for pressing the fabric into contact with the lip at its base, and a tool for clearing the fabric from a false adhesion or contact with the lip to permit a proper setting of the fabric by the pressing tool.

9. A machine for applying reinforcing fabric to a lipped insole, having, in combination, means for holding a sole in position to be operated upon, a tool for pressing the fabric into contact with the lip at its base, and a lip clearer having an operative part at the inner face of the lip to free the fabric from a false adhesion or contact with the lip and permit a proper setting of the fabric by the pressing tool.

10. A machine for applying reinforcing fabric to a lipped insole, having, in combination, means for holding a sole in position to be operated upon, a tool for pressing the fabric into contact with the lip at its base, and a lip clearer acting between the fabric and the face of the lip and in advance of the pressing tool to free the fabric from a false adhesion or contact with the lip and permit a proper setting of the fabric by the pressing tool.

11. A machine for applying reinforcing fabric to a lipped insole, having, in combination, means for holding a sole in position to be operated upon, a tool 20 for laying or setting the fabric into the angle formed by the lip and the face of the insole, and a lip clearing tool 28 in advance of the tool 20 for freeing the fabric from a false adhesion to the lip and presenting it in this condition to the action of the tool 20.

In witness whereof I have signed my name to the specification in the presence of two subscribing witnesses.

CHARLES PETER STANBON.

Witnesses:

HARRY RIVES STANTON,
MAURICE V. BUSNAHAN.